US010395028B2

(12) United States Patent
Dewan et al.

(10) Patent No.: US 10,395,028 B2
(45) Date of Patent: Aug. 27, 2019

(54) VIRTUALIZATION BASED INTRA-BLOCK WORKLOAD ISOLATION

(71) Applicant: Intel Corporation, Santa Clara, CA (US)

(72) Inventors: Prashant Dewan, Hillsboro, OR (US); Uttam Sengupta, Portland, OR (US); Siddhartha Chhabra, Portland, OR (US); David Durham, Beaverton, OR (US); Xiaozhu Kang, Freemont, CA (US); Uday Savagaonkar, Portland, OR (US); Alpa Narendra Trivedi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/656,992

(22) Filed: Jul. 21, 2017

(65) Prior Publication Data

US 2017/0372063 A1  Dec. 28, 2017

Related U.S. Application Data

(63) Continuation of application No. 14/228,994, filed on Mar. 28, 2014.

(51) Int. Cl.
*G06F 9/455* (2018.01)
*G06F 12/08* (2016.01)
(Continued)

(52) U.S. Cl.
CPC .......... *G06F 21/53* (2013.01); *G06F 9/45558* (2013.01); *G06F 21/84* (2013.01);
(Continued)

(58) Field of Classification Search
CPC ...... G06F 21/554; G06F 21/575; G06F 21/84; G06F 21/74; G06F 21/72; G06F 21/52;
(Continued)

(56) References Cited

U.S. PATENT DOCUMENTS 7,656,409 B2    2/2010  Cool et al.
7,941,813 B1 *  5/2011  Protassov ............. G06F 9/4411
                                                  710/33
(Continued)

FOREIGN PATENT DOCUMENTS

CN    101517591 A    8/2009
CN    103034524 A    4/2013
(Continued)

OTHER PUBLICATIONS

Luis Angel D. Bathen, PHiLOSoftware: A Low Power, High Performance, Reliable, and Secure Virtualization Layer for On-Chip Software-Controlled Memories, 2012, [Retrieved on Mar. 22, 2019]. Retrieved from the internet: <URL: https://search.proquest.com/openview/> 24 Pages (1-24) (Year: 2012).*

(Continued)

*Primary Examiner* — Anibal Rivera
(74) *Attorney, Agent, or Firm* — Grossman, Tucker, Perreault & Pfleger, PLLC

(57) ABSTRACT

Generally, this disclosure provides systems, devices, methods and computer readable media for virtualization-based intra-block workload isolation. The system may include a virtual machine manager (VMM) module to create a secure virtualization environment or sandbox. The system may also include a processor block to load data into a first region of the sandbox and to generate a workload package based on the data. The workload package is stored in a second region
(Continued)

of the sandbox. The system may further include an operational block to fetch and execute instructions from the workload package.

20 Claims, 6 Drawing Sheets

(51) Int. Cl.
    *G06F 11/30*     (2006.01)
    *G06F 21/71*     (2013.01)
    *G06F 21/53*     (2013.01)
    *G06F 21/84*     (2013.01)
    *H04L 9/32*     (2006.01)
    *G06F 21/55*     (2013.01)
    *G06F 9/50*     (2006.01)

(52) U.S. Cl.
    CPC ........ *G06F 9/45504* (2013.01); *G06F 9/5011* (2013.01); *G06F 9/5072* (2013.01); *G06F 21/554* (2013.01); *G06F 2009/45587* (2013.01); *G06F 2213/0038* (2013.01); *H04L 9/3247* (2013.01)

(58) Field of Classification Search
    CPC ........ G06F 21/51; G06F 21/53; G06F 21/566; G06F 21/10; G06F 9/461; G06F 9/467; G06F 9/4881; G06F 9/45558; G06F 9/45545; G06F 9/4411; G06F 9/45533; G06F 17/2247; G06F 8/52; G06F 8/63; G06F 8/443; G06F 8/61; G06F 9/5011; G06F 9/5072; G06F 21/76; G06F 17/32
    See application file for complete search history.

(56) References Cited

U.S. PATENT DOCUMENTS

| | | | | |
|---|---|---|---|---|
| 8,146,079 B2* | 3/2012 | Gupta | G06F 9/5077 | 709/223 |
| 8,200,796 B1 | 6/2012 | Margulis | | |
| 8,738,932 B2* | 5/2014 | Lee | G06F 21/72 | 713/190 |
| 8,812,830 B2* | 8/2014 | Raj | G06F 9/45558 | 709/222 |
| 8,913,067 B1* | 12/2014 | Kokkevis | G06F 9/451 | 345/522 |
| 8,938,723 B1* | 1/2015 | Tormasov | G06F 8/52 | 717/136 |
| 9,098,697 B2* | 8/2015 | Yablokov | G06F 21/566 | |
| 9,147,069 B2* | 9/2015 | Yablokov | H04L 63/10 | |
| 9,213,866 B1* | 12/2015 | Ahmad | G06F 21/76 | |
| 9,396,011 B2* | 7/2016 | Zeng | G06F 9/45545 | |
| 9,465,941 B2* | 10/2016 | Wang | G06F 21/566 | |
| 2006/0021029 A1* | 1/2006 | Brickell | G06F 21/51 | 726/22 |
| 2006/0025985 A1* | 2/2006 | Vinberg | G06F 8/65 | 703/22 |
| 2006/0146057 A1* | 7/2006 | Blythe | G06F 9/45537 | 345/506 |
| 2006/0179487 A1* | 8/2006 | Hatakeyama | G06F 12/1458 | 726/26 |
| 2007/0006218 A1* | 1/2007 | Vinberg | G06F 8/61 | 717/174 |
| 2007/0136579 A1* | 6/2007 | Levy | H04L 63/102 | 713/168 |
| 2007/0146373 A1* | 6/2007 | Cool | G06F 9/5044 | 345/502 |
| 2007/0226795 A1* | 9/2007 | Conti | G06F 21/554 | 726/22 |
| 2007/0294496 A1* | 12/2007 | Goss | G06F 12/1408 | 711/163 |
| 2008/0059214 A1* | 3/2008 | Vinberg | G06F 8/61 | 709/221 |
| 2008/0279189 A1* | 11/2008 | Smith | H04L 47/564 | 370/394 |
| 2008/0307414 A1* | 12/2008 | Alpern | G06F 9/45558 | 718/1 |
| 2009/0063869 A1* | 3/2009 | Kohavi | G06F 21/53 | 713/189 |
| 2009/0070752 A1* | 3/2009 | Alpern | G06F 8/443 | 717/148 |
| 2009/0275407 A1* | 11/2009 | Singh | G07F 17/32 | 463/31 |
| 2010/0082926 A1* | 4/2010 | Sahita | G06F 12/145 | 711/163 |
| 2010/0146293 A1* | 6/2010 | Shi | G06F 21/10 | 713/189 |
| 2010/0146501 A1* | 6/2010 | Wyatt | G06F 21/53 | 718/1 |
| 2010/0332760 A1* | 12/2010 | McKeen | G06F 21/53 | 711/125 |
| 2011/0102443 A1* | 5/2011 | Dror | G06T 1/20 | 345/522 |
| 2011/0125973 A1* | 5/2011 | Lev | G06F 9/467 | 711/153 |
| 2011/0173607 A1* | 7/2011 | Murphey | G06F 8/71 | 718/1 |
| 2011/0191562 A1* | 8/2011 | Chou | G06F 12/06 | 711/163 |
| 2011/0265081 A1* | 10/2011 | Lucovsky | G06F 8/60 | 717/177 |
| 2011/0296487 A1* | 12/2011 | Walsh | G06F 21/10 | 726/1 |
| 2012/0005270 A1* | 1/2012 | Harding | G05B 19/4148 | 709/203 |
| 2012/0017213 A1* | 1/2012 | Hunt | G06F 21/53 | 718/100 |
| 2012/0030672 A1* | 2/2012 | Zygmuntowicz | G06F 8/60 | 718/1 |
| 2012/0047576 A1* | 2/2012 | Do | G06F 12/1483 | 726/22 |
| 2012/0110164 A1 | 5/2012 | Frey et al. | | |
| 2012/0117301 A1* | 5/2012 | Wingard | G06F 12/1027 | 711/6 |
| 2012/0227038 A1* | 9/2012 | Hunt | G06F 9/45558 | 718/1 |
| 2012/0331550 A1* | 12/2012 | Raj | G06F 21/53 | 726/22 |
| 2013/0031291 A1* | 1/2013 | Edwards | G06F 21/554 | 711/6 |
| 2013/0091500 A1 | 4/2013 | Earl et al. | | |
| 2013/0139264 A1* | 5/2013 | Brinkley | G06F 21/566 | 726/24 |
| 2013/0152209 A1* | 6/2013 | Baumann | G06F 21/53 | 726/26 |
| 2013/0185729 A1* | 7/2013 | Vasic | G06F 9/5072 | 718/104 |
| 2013/0187932 A1* | 7/2013 | Malakapalli | G06T 1/20 | 345/501 |
| 2013/0219384 A1* | 8/2013 | Srinivasan | G06F 9/45558 | 718/1 |
| 2013/0298205 A1 | 11/2013 | O'Connor et al. | | |
| 2014/0053057 A1* | 2/2014 | Reshadi | G06F 17/2247 | 715/234 |
| 2014/0089914 A1* | 3/2014 | Kay | G06F 9/45504 | 717/176 |
| 2014/0137255 A1* | 5/2014 | Wang | G06F 21/566 | 726/24 |
| 2014/0173600 A1* | 6/2014 | Ramakrishnan Nair | G06F 9/461 | 718/1 |
| 2014/0189683 A1* | 7/2014 | Bing | G06F 9/45533 | 718/1 |
| 2014/0229942 A1* | 8/2014 | Wiseman | G06F 9/45558 | 718/1 |
| 2014/0282501 A1* | 9/2014 | Zeng | G06F 9/45545 | 718/1 |

(56) References Cited

U.S. PATENT DOCUMENTS

| | | | | |
|---|---|---|---|---|
| 2014/0282890 | A1* | 9/2014 | Li | H04L 63/101 726/4 |
| 2014/0289418 | A1* | 9/2014 | Cohen | G06F 11/3688 709/226 |
| 2014/0337835 | A1* | 11/2014 | Johnson | G06F 9/45558 718/1 |
| 2015/0058992 | A1* | 2/2015 | El-Moussa | H04L 63/145 726/24 |
| 2015/0113540 | A1* | 4/2015 | Rabinovici | G06F 9/5011 718/104 |
| 2015/0172260 | A1* | 6/2015 | Brenner | H04L 63/083 713/171 |
| 2015/0172311 | A1* | 6/2015 | Freedman | H04L 63/1433 726/1 |
| 2015/0186678 | A1* | 7/2015 | Leslie-Hurd | G06F 21/74 726/26 |
| 2015/0256481 | A1* | 9/2015 | Turovsky | H04L 47/76 709/226 |

FOREIGN PATENT DOCUMENTS

| | | |
|---|---|---|
| KR | 1020110052194 A | 5/2011 |
| KR | 1020130132859 A | 12/2013 |
| TW | 201232410 A | 8/2012 |

OTHER PUBLICATIONS

Chia-Che Tsai et al., Cooperation and Security Isolation of Library OSes for Multi-Process Applicaitons, 2014, [Retrieved on Mar. 22, 2019]. Retrieved from the internet: <URL: http://www.cs.unc.edu/~porter/pubs/tsai14graphene.pdf> 14 Pages (1-14) (Year: 2014).*

Chinese Office Action issued in Chinese Application No. 201580010723.2, dated May 2, 2018, with English machine translation, 16 pages.

International Search Report and Written Opinion received for PCT Application No. PCT/US2015/022802, dated Jun. 24, 2015, 13 pages.

International Preliminary Report on Patentability and Written Opinion received for PCT Application No. PCT/US2015/022802, dated Oct. 13, 2016, 10 pages.

Oracle: "Introduction to Oracle Solaris Zones", Part No. E54762, Nov. 2016, 40 pages.

Oracle: "Oracle Solaris 11.1 Administration: Oracle Solaris Zones, Oracle Solaris 10 Zones, and Resource Management", Part No. E29024-04, May 2013, 444 pages.

Oracle: "Oracle SuperCluster M7 Series Security Guide", Part No. E58630-04, Jan. 2017, 142 pages.

Oracle Supercluster: "Oracle SuperCluster M7 Platform Security Principles and Capabilities", Oracle Technical White Paper, Nov. 2016, 23 pages.

Office Action issued in U.S. Appl. No. 14/228,994, dated Feb. 18, 2016, 18 pages.

Office Action issued in U.S. Appl. No. 14/228,994, dated Jan. 26, 2017, 18 pages.

Final Office Action issued in U.S. Appl. No. 14/228,994, dated Jul. 8, 2016, 18 pages.

Final Office Action issued in U.S. Appl. No. 14/228,994, dated Jun. 13, 2017, 26 pages.

Wikipedia: "Digital signature—Wikipedia", Jan. 26, 2014, XP055391708, Retrieved from the Internet: URL:https://en.wikipedia.org/w/index.php?title=Digital_signature&oldid=592423738, retrieved on Jul. 18, 2017, 10 pages.

European Communication issued in European Application No. 15768805.2, dated Aug. 11, 2017, 1 page.

European Extended Search Report issued in European Application No. 15768805.2, dated Jul. 26, 2017, 8 pages.

Chinese Notice of Allowance received in Chinese Patent Application No. 201580010723.2, dated Jan. 14, 2019, 7 pages.

* cited by examiner

VIRTUALIZATION BASED INTRA-BLOCK WORKLOAD ISOLATION

CROSS-REFERENCE TO RELATED APPLICATIONS

The present application is a continuation of U.S. patent application Ser. No. 14/228,994, filed on Mar. 28, 2014, the entire disclosure of which is incorporated herein by reference.

FIELD

The present disclosure relates to intra-block workload isolation, for example on component blocks of a system-on-a-chip (SoC), and more particularly, to intra-block workload isolation employing a security engine or virtual machine manager (VMM).

BACKGROUND

Computing systems, such as, for example a system-on-a-chip (SoC) or other types of platforms, typically have one or more processors or cores as well as other operational blocks or components which may include device controllers, graphics processors, audio processors, communication modules, etc. These operational blocks are often capable of executing multiple workloads in a manner similar to that in which a processor may execute multiple threads. Security issues can arise in this situation. An untrusted workload executing on an operational block can inadvertently or maliciously interfere with the execution of another workload on that same operational block (i.e., intra-block interference). For example, different workloads executing on a media engine (graphics, imaging, video, etc.) may potentially interfere with each other (whether maliciously or inadvertently), thereby disrupting the normal flow or desired operation of the workloads.

Although access control mechanisms may be available for inter-block transactions and/or block-to-memory transactions, these techniques do not address the problem of intra-block interference which is becoming increasingly important as the industry moves further towards heterogeneous computing and parallel workload execution.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for virtualization-based intra-block workload isolation. A system, for example a system-on-a-chip (SoC), may include a processing block (core or CPU), memory and one or more other operational blocks or components such as, for example, a device controller, graphics processor (GPU), audio processor, imaging device, communication module, etc. Each operational block may be configured to execute multiple workloads. The workloads may be generated by the CPU and submitted as a workload package to the operational block for execution. The workload may be generated and securely stored in memory, for example using virtualization and page-table based access, to contain the workload in a sandbox. A virtual machine manager (VMM), or other type of security engine, may be configured to allow the operational block to execute the workload from the sandbox in a particular context such that any other code executing on that operational block, including other workloads in other sandboxes, may not access that sandbox. Virtualization may therefore be used to provide workload isolation within an operational block, including isolation of code, data (memory or register contents) and state information associated with the workload, as will be described in greater detail below. The VMM may also be configured to allow the operational block to securely write back results into the sandbox, based on the workload execution.

Figure 1:
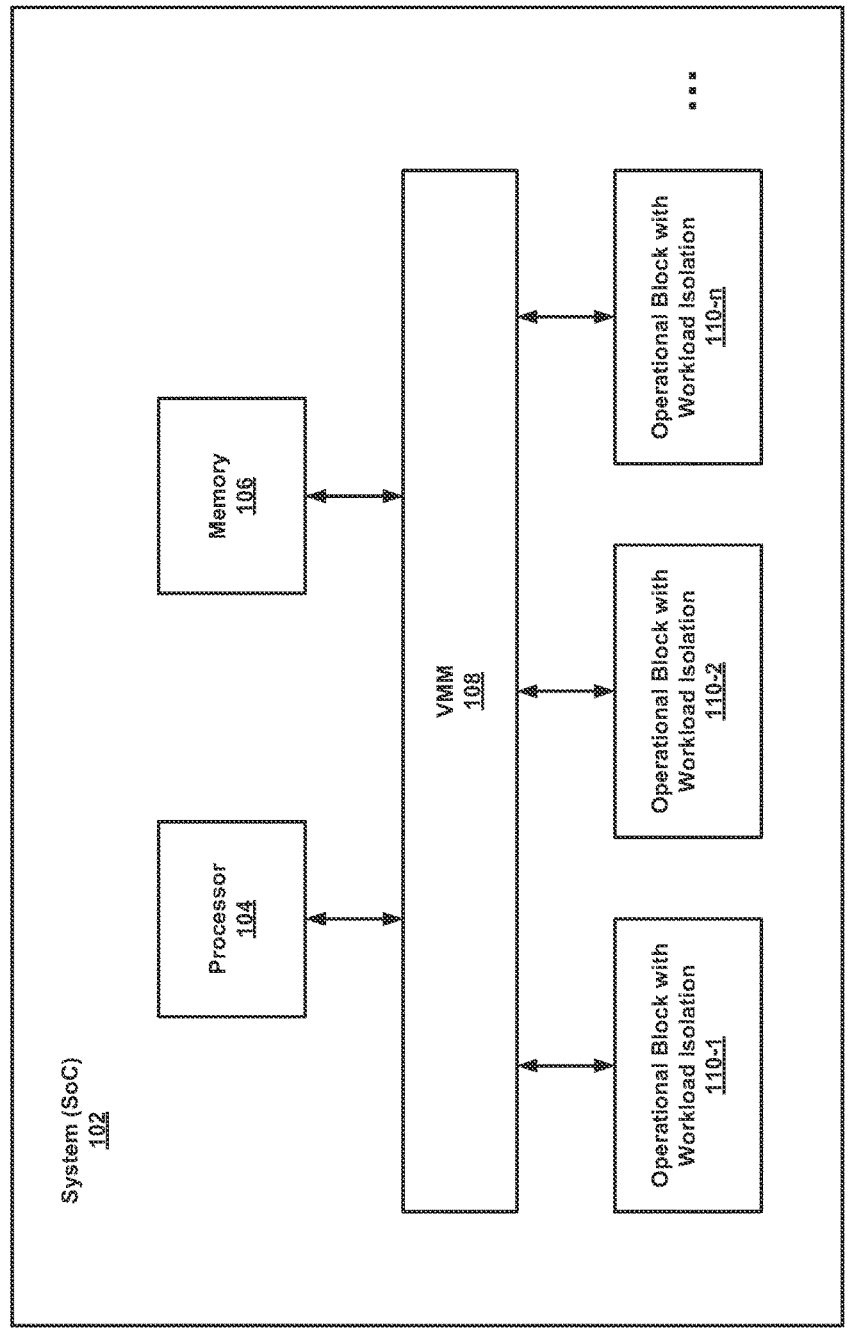
FIG. 1 illustrates a top level system diagram of one example embodiment consistent with the present disclosure.

FIG. 1 illustrates a top level system diagram 100 of one example embodiment consistent with the present disclosure. A system 102, which may be a system-on-a-chip (SoC) or other type of computing or communication platform, fixed or mobile, is shown to include a number of blocks or components including a processor 104, memory 106, a VMM 108 and one or more operational blocks 110-1, . . . 110-n configured for workload isolation.

In some embodiments, a third party entity (not shown), for example an internet service vendor, may send requests to system 102. To fulfill these requests, processor 104 may generate and submit a workload to one of the operational blocks 110 for execution along with other workloads. The results of the execution may be returned to the third party entity and the processor 102 may attest to the security or integrity of the results due to the workload isolation capabilities of the system, as will be described in greater detail below.

Figure 2:
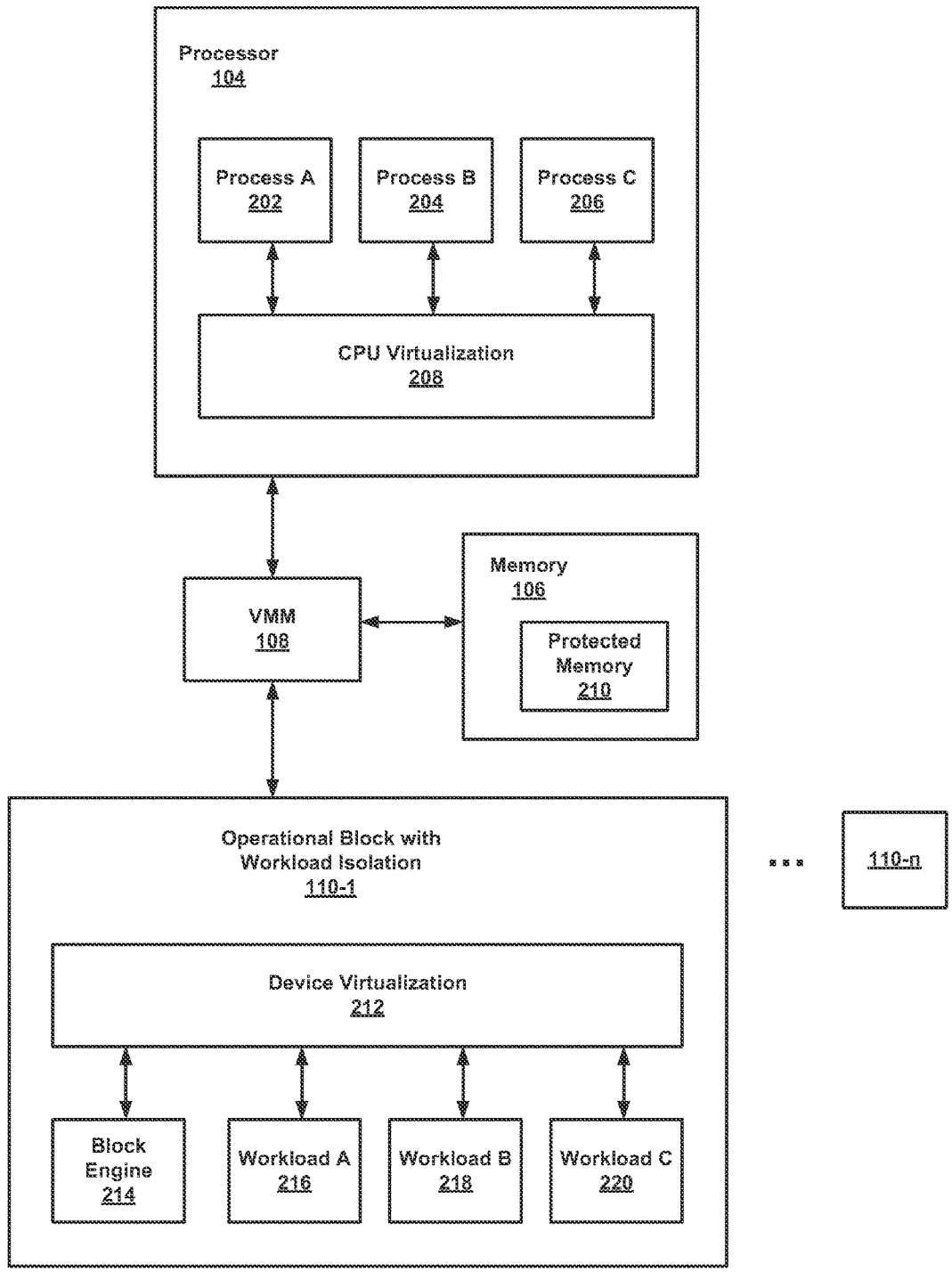
FIG. 2 illustrates a block diagram of one example embodiment consistent with the present disclosure.

FIG. 2 illustrates a block diagram 200 of one example embodiment consistent with the present disclosure. Processor 104 may be configured to execute one or more processes (or threads), for example process A 202, process B 204 and process C 206. These processes may include an operating system (OS), applications or any other system or user software components. One or more of these processes 202, 204, 206 may be in communication with external or third party entities, for example internet service vendors, that make requests of the processes. These requests may eventually be tasked to one or more of the operational blocks 110 in the form of generated workloads, as described below.

Operational blocks 110 are shown to include a block engine 214 which may be a processor or circuit configured to execute one or more workloads, for example workload A 216, workload B 218 and workload C 220. The workloads may be associated with (e.g., generated by or on behalf of) the processes. For example, workload A 216 may be associated with process A 202, etc., although this need not be the case. The workloads may be isolated from each other, for example through virtualization hardware support or other suitable mechanisms, to provide security and prevent unintentional or malicious interference between workloads on a given operational block.

A CPU virtualization 208 is generated by VMM 108 as an interface between the processor 104, processes 202, 204, 206, memory 106 and the operational blocks 110. Page tables may be used as part of this virtualization to translate between physical and virtual addresses and to maintain access controls (e.g., read/write/execute) to the protected regions or pages 210 of memory 106 which are associated with the sandbox. Similarly, a device virtualization 212 is generated by VMM 108 as an interface between the operational blocks 110 and processor 104 and memory 106 based on page tables and access controls.

The VMM is configured to provide virtualization environments that act as secure containers or sandboxes for the workloads. The sandbox is protected from the process that is hosting it and is protected from the OS and other processes on processor 104, so that malware on the platform cannot interfere with the generation of the workload. The sandbox is also protected from other workloads and software components executing on the operational block. In some embodiments, the VMM may set the access controls, for the region of the sandbox containing the workload package, to be non-executable for all entities other than the code inside the sandbox. The sandbox thus provides workload isolation within an operational block, including isolation of code, data (memory or register contents) and state information associated with the workload.

In some embodiments, the operational blocks may include a memory access controller configured to monitor the context of the workloads and enforce access control policies (e.g., read/write/execute permissions).

Figure 3:
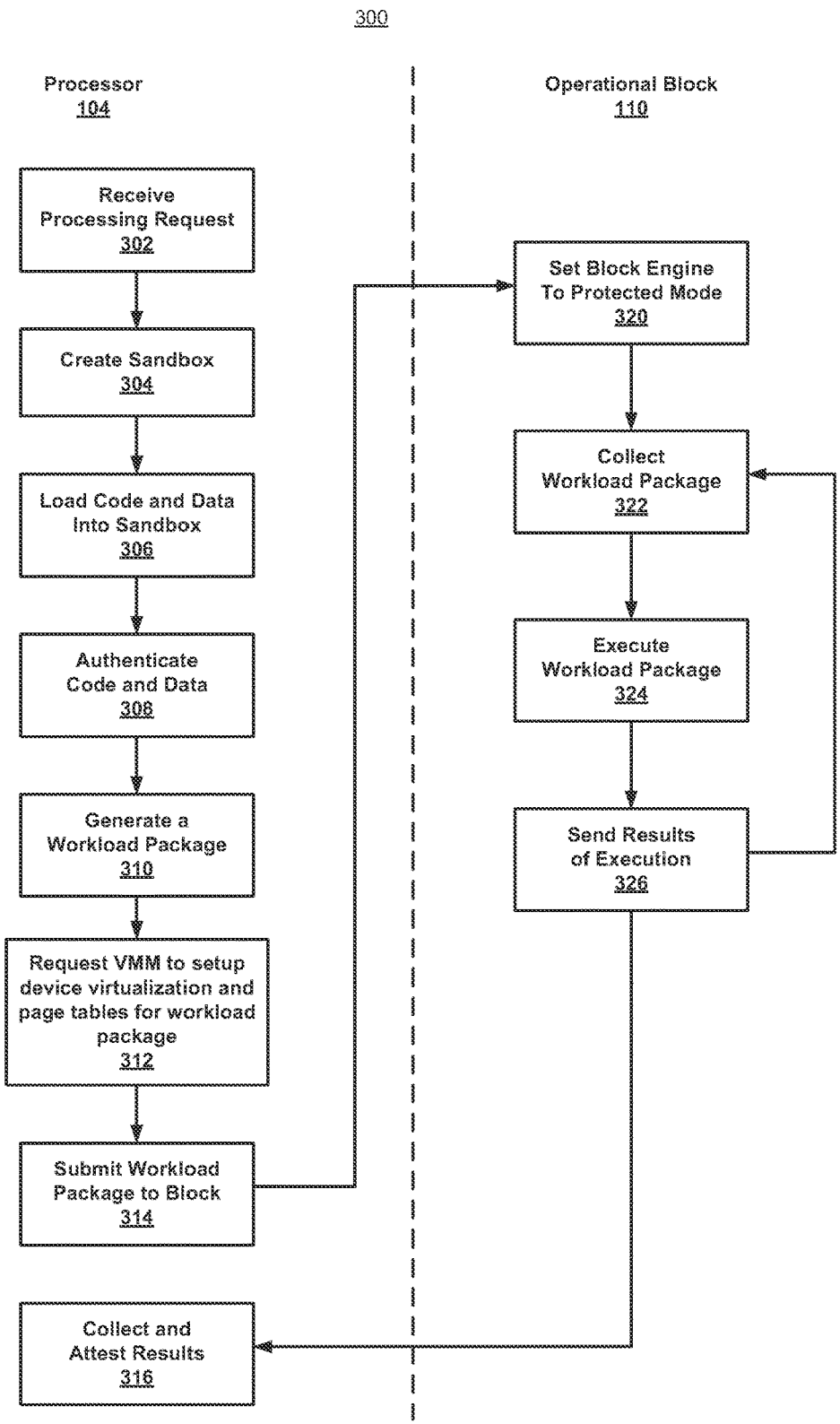
FIG. 3 illustrates a flowchart of operations of one example embodiment consistent with the present disclosure.

FIG. 3 illustrates a flowchart of operations 300 of one example embodiment consistent with the present disclosure. The interaction between operations of processor 104, on the left side of the figure, and the operations of block 110, on the right side of the figure is shown in greater detail. At operation 302, the processor receives a request, for example from a third party or other entity. The request may include code and/or data in any suitable format. The processor, at operation 304, creates a secure virtualization environment (e.g., sandbox) using VMM 108 or any other type of security engine. At operation 306, the processor loads the code/data into a region (or pages) of the sandbox and, at operation 308, authenticates it, for example using cryptographic techniques or any other suitable verification mechanism. At operation 310, the processor generates a workload package based on the provided code/data or based on additional information obtained from another source or created locally. The workload package is also stored in the sandbox, for example in a second region that may or may not overlap to any extent with the first region. The workload package may be generated from the provided code/data through any suitable type of translation, conversion, unpacking and/or decryption process. The generated workload package may include instructions suitable for execution by an engine of the operational block.

At operation 312, the processor requests the VMM to setup device virtualization, including page tables, through which the operational block may access the workload package. At operation 314, the workload package is submitted to the operational block.

At operation 320, the operational block sets the block engine to a secure or protected mode, which may be a hardware mode of the block engine or a state identifier maintained by the VMM. In this secure mode, the engine may only fetch and execute instructions from the sandbox designated by the VMM. At operations 322 and 324, the operational block collects and executes the workload package by fetching instructions (and data) from the sandbox. Results of the execution may be written back, at operation 326, to a third region of the sandbox, which may or may not overlap to any extent with the other regions. At operation 316, the processor collects these results and may return them to the third party requesting entity. The processor may also attest to the security or integrity of the results based on the workload isolation.

In some embodiments, the workload package may be generated by an embedded security engine such as, for example, a converged security engine (CSE) or a converged security manageability engine (CSME). The CSE may be configured to spawn a process to create the workload package in response to an application request. The CSE spawned process is isolated from other CPU software, processes and applications to provide protection from interference or attacks.

In some embodiment, the CSE may be configured to encrypt the code/data as a Binary Large Object (BLOB) and cryptographically bind it to the operational block using the VMM. Only an authorized operational block may be configured to decrypt the code/data to obtain the workload package. The VMM may identify the authorized operational block and provide the credentials needed for decryption. This embodiment may be particularly useful for relatively "dumb" devices, such as for example a display element, that do not execute code and/or may not share an address space with the processor.

Figure 4:
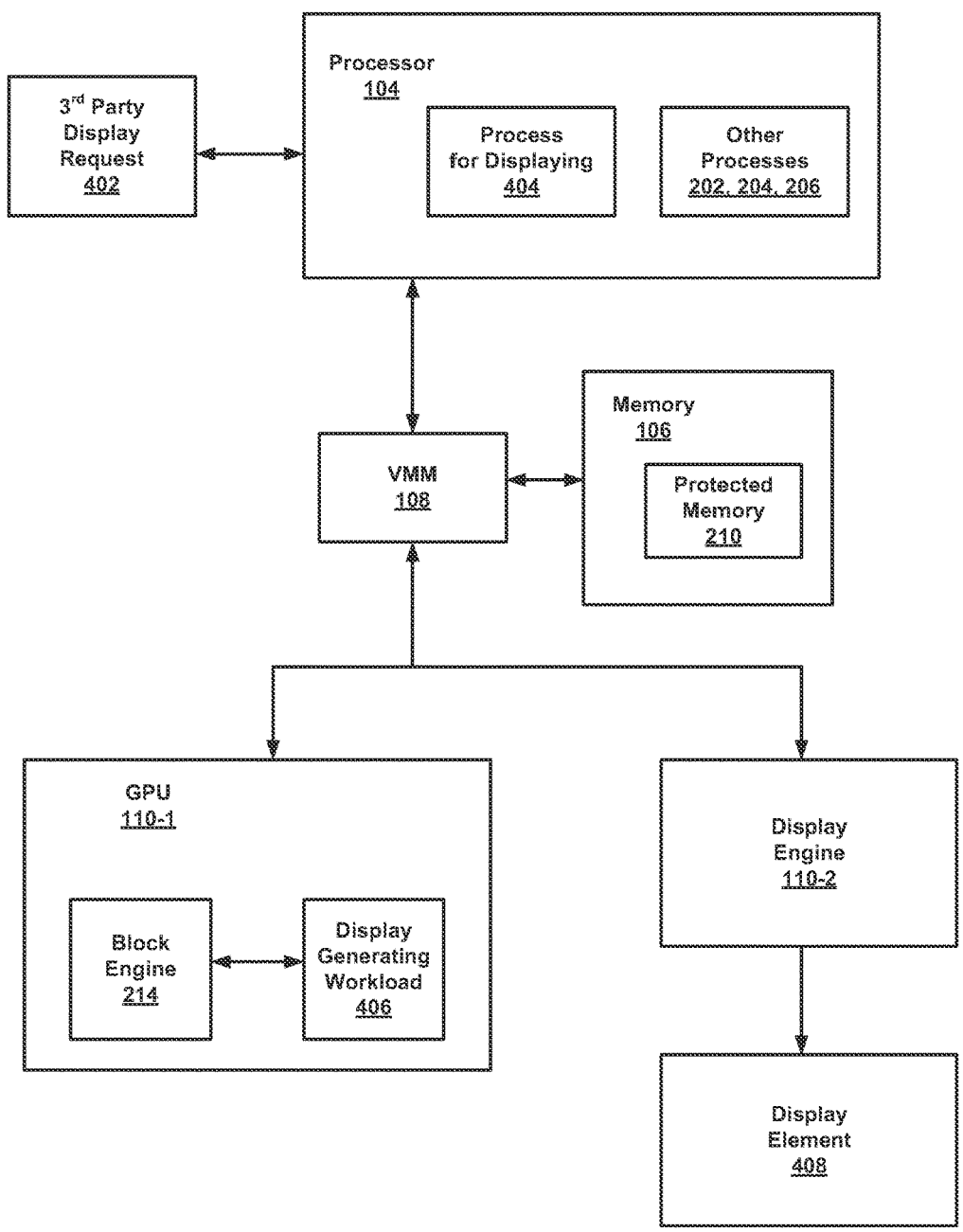
FIG. 4 illustrates a block diagram of another example embodiment consistent with the present disclosure.

FIG. 4 illustrates a block diagram 400 of another example embodiment consistent with the present disclosure. A simplified example is shown that includes just two operational blocks: a graphics processing unit (GPU) 110-1 and a display engine 110-2. The GPU 110-1 is generally configured to generate a display surface (e.g., a bitmap to be displayed) while the display engine 110-2 is generally configured to provide the driving signals to a display element 408 to cause the display surface to be displayed.

In this example, a third party 402 may submit a request to the system to display an image of some sort. The request may specify the image at any level of abstractness (for example, ranging from a general description down to individual pixels) and may include data, code, pseudo-code and/or algorithms that may be used to generate the image. Process 404, on processor 104, may receive this code/data and load it into a virtualization and page-table based container or sandbox where it will be protected from other processes 202, 204, 206 including the OS. Process 404 may be configured to verify the authenticity of the code/data and use it to generate a workload package for the GPU 110-1. The workload package may include GPU understandable machine code. Access controls for the memory region (pages) of the sandbox that holds the generated workload package may be set, for example by the VMM 108, to non-executable status to prevent unintended execution by any other unauthorized processes or processing blocks.

The VMM 108 may further be requested to allow the GPU, for example through block engine 214, to fetch and execute instructions from the workload package in the sandbox. The execution of these instructions forms the basis for display generating workload 406 which may be configured to generate a display surface that corresponds to the request from third party 402. The generated display surface may be stored in a region of the sandbox dedicated to workload results. The VMM may be configured to allow the display engine 110-2 to access this results region of the sandbox. In some embodiments, however, the results may be transmitted directly from the GPU 110-1 to the display engine 110-2, in which case the results may be encrypted and a key (for decryption) may be provided to the display engine in a secure manner through the VMM.

The VMM 108 may also be configured to arbitrate between requests for display resources from multiple sandboxes, each sandbox executing a display generating workload. For example, if there are multiple requests for Z-order priority (an image plane or surface from one sandbox overlapping an image plane from another sandbox), the VMM may decide the priority and determine which portions of the images are displayed. The VMM can provide the cryptographic resources needed by the display engine 110-2 to display surfaces on behalf of multiple sandboxes. The display engine may be configured to keep track of which surfaces belong to which sandbox and to prevent workload requests from any sandbox to read a surface that does not belong to it. Similarly, the display engine 110-2 may be configured to enforce the Z-order, as requested by the workload of the sandbox. The display engine may also be configured to generate a snapshot of the configuration of display surfaces and send it to the sandbox as proof of visibility of the surface. The display engine may further notify the sandbox whenever the configuration of display surfaces does not conform to the configuration requested by the sandbox.

Figure 5:
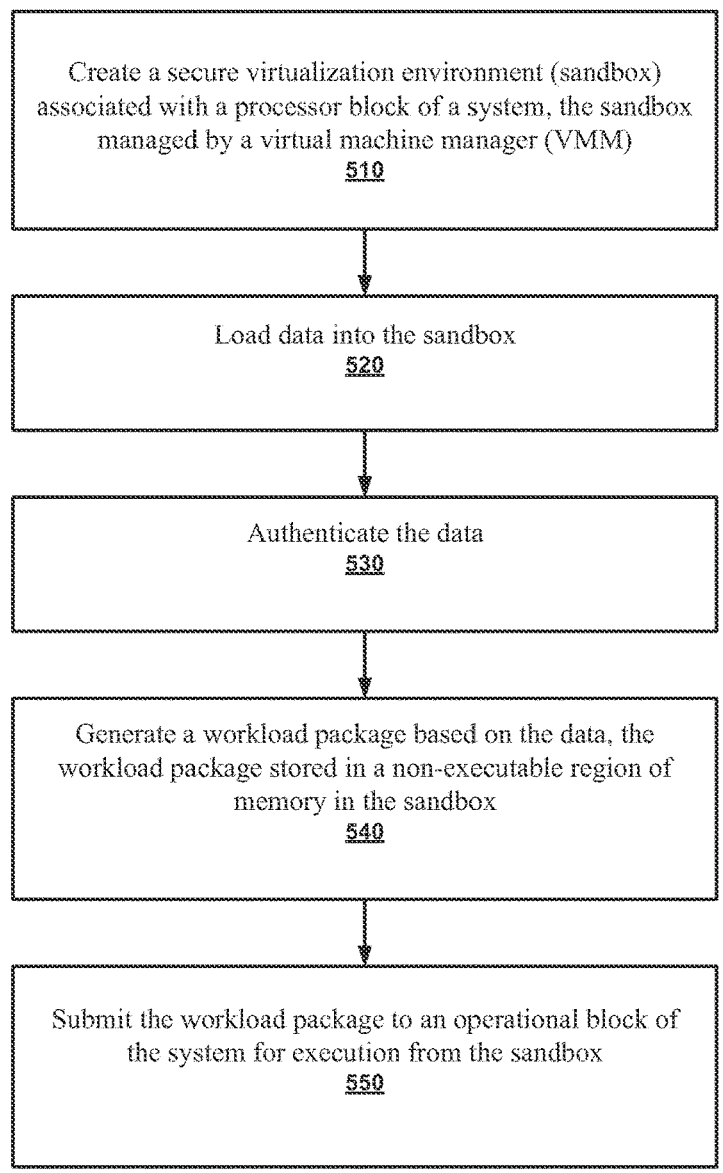
FIG. 5 illustrates a flowchart of operations of another example embodiment consistent with the present disclosure.

FIG. 5 illustrates a flowchart of operations 500 of another example embodiment consistent with the present disclosure. The operations provide a method for virtualization-based intra-block workload isolation. At operation 510, a secure virtualization environment (sandbox) is created. The sandbox is associated with a processor block of a system and managed by a virtual machine manager (VMM). At operation 520, data is loaded into the sandbox. The data loading may be performed by the processor block. At operation 530, the data is authenticated. At operation 540, a workload package is generated based on the data. The workload package, which is associated with the workload, is stored in a non-executable region of memory in the sandbox. At operation 550, the workload package is submitted to an operational block of the system for execution from the sandbox.

Figure 6:
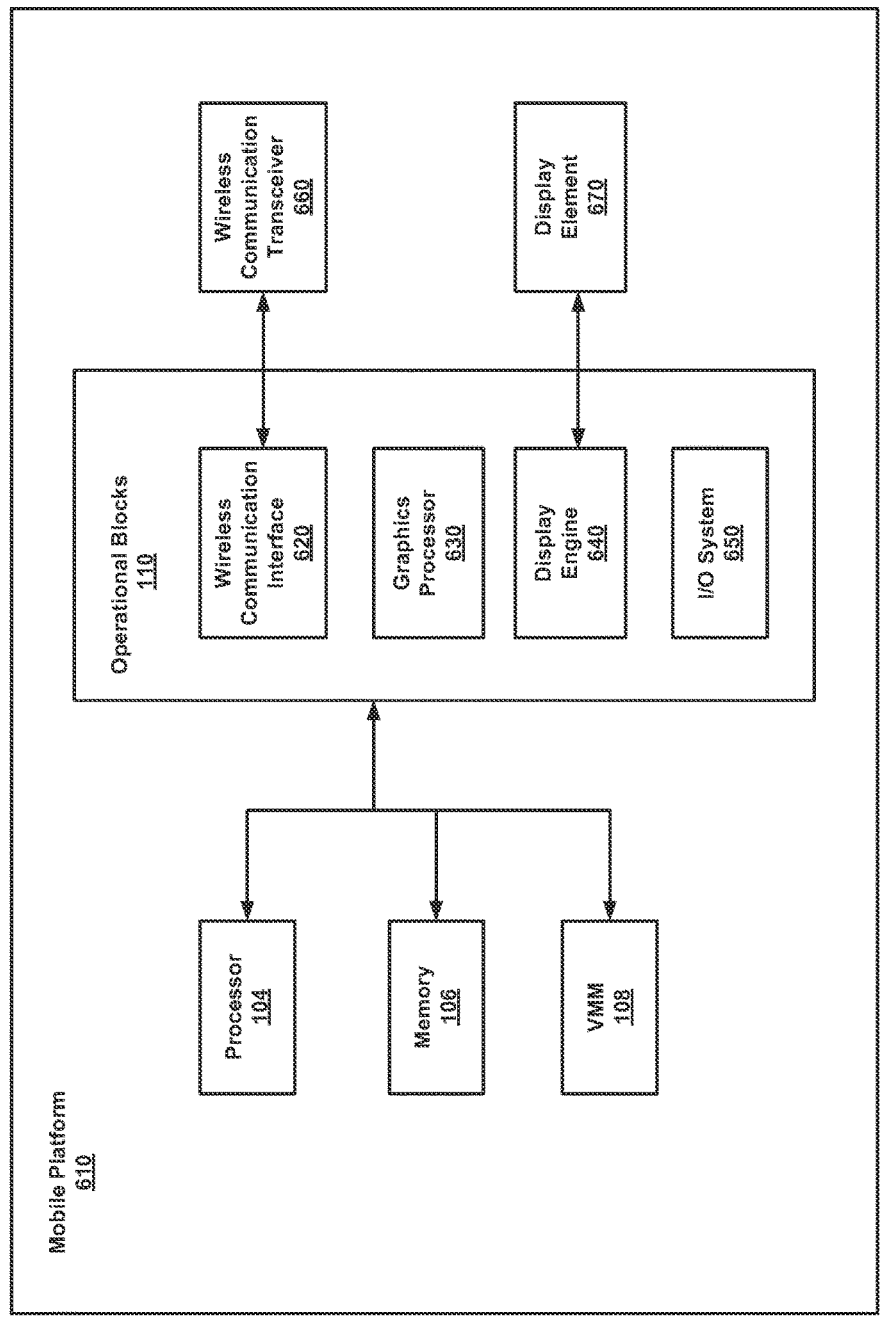
FIG. 6 illustrates a system diagram of a platform of another example embodiment consistent with the present disclosure.

FIG. 6 illustrates a system diagram 600 of one example embodiment consistent with the present disclosure. The system 600 may be a mobile platform 610 or computing device such as, for example, a smart phone, smart tablet, personal digital assistant (PDA), mobile Internet device (MID), convertible tablet, notebook or laptop computer, desktop computer, server, smart television or any other device whether fixed or mobile. The device may generally present various interfaces to a user via a display element 670 such as, for example, a touch screen, liquid crystal display (LCD) or any other suitable display type.

The system 600 is shown to include a processor 104. In some embodiments, processor 104 may be implemented as any number of processor cores. The processor (or processor cores) may be any type of processor, such as, for example, a micro-processor, an embedded processor, a digital signal processor (DSP), a network processor, a field programmable gate array or other device configured to execute code. Processor 104 may be a single-threaded core or, a multi-threaded core in that it may include more than one hardware thread context (or "logical processor") per core. System 600 is also shown to include a memory 106 coupled to the processor 104. The memory 106 may be any of a wide variety of memories (including various layers of memory hierarchy and/or memory caches) as are known or otherwise available to those of skill in the art. System 600 is also shown to include a VMM module 108, or other suitable security engine, as described previously.

System 600 is also shown to include any number of operational blocks 110 which may include an input/output (IO) system or controller 650 which may be configured to enable or manage data communication between processor 104 and other elements of system 600 or other elements (not shown) external to system 600. Operational blocks 110 may also include a wireless communication interface 620 configured to enable wireless communication between system 600 and any external entity, for example, through a wireless communication transceiver 660. The wireless communications may conform to or otherwise be compatible with any existing or yet to be developed communication standards including mobile phone communication standards. Operational blocks 110 may also include a graphics processor (or GPU) 630 and a display engine 640 configured to drive display element 670. Operational blocks 110 may be configured to provide intra-block workload isolation, as described herein, employing the security capabilities of VMM module 108.

It will be appreciated that in some embodiments, the various components of the system 600 may be combined in a system-on-a-chip (SoC) architecture. In some embodiments, the components may be hardware components, firmware components, software components or any suitable combination of hardware, firmware or software.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hard-wired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems, devices, methods and computer readable media for virtualization-based intra-block workload isolation. The following examples pertain to further embodiments.

According to example 1 there is provided a system for intra-block workload isolation. The system may include a virtual machine manager (VMM) module to create a secure virtualization environment (sandbox). The system of this example may also include a processor block to load data into a first region of the sandbox. The processor block of this example may be further configured to generate a workload package, associated with the workload, the workload package based on the data and stored in a second region of the sandbox. The system of this example may further include an operational block to fetch and execute instructions from the workload package.

Example 2 may include the elements of the foregoing example, and the VMM is further to set access controls of the second region of the sandbox to provide intra-block isolation of code, data and state information associated with the workload.

Example 3 may include the elements of the foregoing examples, and the VMM is further to set access controls of the second region of the sandbox to a non-executable mode.

Example 4 may include the elements of the foregoing examples, and the VMM is further to set access controls of the second region of the sandbox to an executable mode for the operational block during a selected period of execution of the workload package.

Example 5 may include the elements of the foregoing examples, and the operational block is further to write results to a third region of the sandbox, the results based on execution of the workload package.

Example 6 may include the elements of the foregoing examples, and the processor block is further to cryptographically authenticate the data.

Example 7 may include the elements of the foregoing examples, and the VMM is further to provide page table based translation between virtual and physical addresses associated with the sandbox and further to provide read/write/execute access control associated with the addresses.

Example 8 may include the elements of the foregoing examples, and the operational block is selected from the group consisting of a graphics processing unit, a device controller, a wireless communications interface, a digital signal processor and an audio processor.

Example 9 may include the elements of the foregoing examples, and the system is a system-on-a-chip.

Example 10 may include the elements of the foregoing examples, and the system is a smart phone, a laptop computing device, a smart TV or a smart tablet.

Example 11 may include the elements of the foregoing examples, and further including a user interface, and the user interface is a touch screen.

According to example 12 there is provided a method for intra-block workload isolation. The method of this example may include creating a secure virtualization environment (sandbox) associated with a processor block of a system, the sandbox managed by a virtual machine manager (VMM). The method of this example may also include loading data into the sandbox. The method of this example may further include authenticating the data. The method of this example may further include generating a workload package, associated with the workload, the workload package based on the data and stored in a non-executable region of memory in the sandbox. The method of this example may further include submitting the workload package to an operational block of the system for execution from the sandbox.

Example 13 may include the elements of the foregoing examples, and further include setting access controls on the sandbox to provide intra-block isolation of code, data and state information associated with the workload.

Example 14 may include the elements of the foregoing examples, and the submitting further includes requesting the VMM to enable the operational block to fetch and execute instructions from the workload package.

Example 15 may include the elements of the foregoing examples, and further include receiving results from the operational block, the results based on the execution.

Example 16 may include the elements of the foregoing examples, and the receiving further includes requesting the VMM to enable the operational block to write to a region of memory in the sandbox.

Example 17 may include the elements of the foregoing examples, and the operational block is a graphics processing unit, a device controller, a wireless communications interface, a digital signal processor or an audio processor.

Example 18 may include the elements of the foregoing examples, and the authenticating further includes verifying an encryption signature.

Example 19 may include the elements of the foregoing examples, and the VMM provides page table based translation between virtual and physical addresses associated with the sandbox and further provides read/write/execute access control associated with the addresses.

According to example 20 there is provided a system for intra-block workload isolation. The system of this example may include a means for creating a secure virtualization environment (sandbox) associated with a processor block of a system, the sandbox managed by a virtual machine manager (VMM). The system of this example may also include a means for loading data into the sandbox. The system of this example may further include a means for authenticating the data. The system of this example may further include a means for generating a workload package, associated with the workload, the workload package based on the data and stored in a non-executable region of memory in the sandbox. The system of this example may further include a means for submitting the workload package to an operational block of the system for execution from the sandbox.

Example 21 may include the elements of the foregoing examples, and further include a means for setting access controls on the sandbox to provide intra-block isolation of code, data and state information associated with the workload.

Example 22 may include the elements of the foregoing examples, and the means for submitting further includes means for requesting the VMM to enable the operational block to fetch and execute instructions from the workload package.

Example 23 may include the elements of the foregoing examples, and further include a means for receiving results from the operational block, the results based on the execution.

Example 24 may include the elements of the foregoing examples, and the means for receiving further includes means for requesting the VMM to enable the operational block to write to a region of memory in the sandbox.

Example 25 may include the elements of the foregoing examples, and the operational block is a graphics processing unit, a device controller, a wireless communications interface, a digital signal processor or an audio processor.

Example 26 may include the elements of the foregoing examples, and the means for authenticating further includes means for verifying an encryption signature.

Example 27 may include the elements of the foregoing examples, and the VMM provides means for page table based translation between virtual and physical addresses associated with the sandbox and further provides means for read/write/execute access control associated with the addresses.

According to another example there is provided at least one computer-readable storage medium having instructions stored thereon which when executed by a processor, cause the processor to perform the operations of the method as described in any of the examples above.

According to another example there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. One or more non-transitory computer-readable storage devices having instructions stored thereon that, when executed by at least one processor of a first computing device, result in operations for workload isolation, the operations comprising:
create a secure virtualization environment associated with a processor block of a system, the secure virtualization environment managed by a virtual machine manager (VMM);
load data into a memory of the secure virtualization environment;
generate a workload package, wherein the workload package is associated with a first workload and a second workload, the workload package based on the data and stored in the memory of the secure virtualization environment; and
submit the workload package to an operational block of the system;
cause the operational block to execute the first and second workloads from the secure virtualization environment;
wherein the workloads being executed in the secure virtualization environment are isolated from other operations being executed by the operational block.

2. The one or more non-transitory computer-readable storage media of claim 1, wherein the secure virtualization environment is a sandbox.

3. The one or more non-transitory computer-readable storage media of claim 1, wherein the secure virtualization environment is a secure container.

4. The one or more non-transitory computer-readable storage media of claim 1, wherein the data is loaded into a first memory region of the memory of the secure virtualization environment and the workload package is stored in a second memory region of the memory of the secure virtualization environment.

5. The one or more non-transitory computer-readable storage media of claim 4, wherein the second memory region of the secure virtualization environment is non-executable.

6. The one or more non-transitory computer-readable storage media of claim 5, wherein the second memory region of the secure virtualization environment is non-executable for entities outside the secure virtualization environment.

7. The one or more non-transitory computer-readable storage media of claim 4 having additional instructions stored thereon which, when executed by the at least one processor, result in further operations comprising:
cause the operational block to write results to a third memory region of the memory of the secure virtualization environment, the results based on the execution of the first and second workloads.

8. The one or more non-transitory computer-readable storage media of claim 4, wherein content stored in the first memory region does not overlap with content stored in the second memory region.

9. A system for workload isolation, the system comprising:
virtual machine manager (VMM) circuitry to manage a secure virtualization environment;
a processor to:
load data into a memory of the secure virtualization environment;
generate a workload package, wherein the workload package is associated with at least a first workload and a second workload, the workload package based on the data and stored in the memory of the secure virtualization environment; and
submit the workload package to an operational block of the system; and
an operational block to execute the first and second workloads from the secure virtualization environment;
wherein the workloads being executed in the secure virtualization environment are isolated from other operations being executed by the operational block.

10. The system of claim 9, wherein the data is loaded into a first memory region of the memory of the secure virtualization environment and the workload package is stored in a second memory region of the memory of the secure virtualization environment.

11. The system of claim 10, wherein the second memory region of the secure virtualization environment is non-executable.

12. The system of claim 11, wherein the second memory region of the secure virtualization environment is non-executable for entities outside the secure virtualization environment.

13. The system of claim 10, wherein the operational block is further to write results to a third memory region of the memory of the secure virtualization environment, the results based on the execution of the first and second workloads.

14. The system of claim 10, wherein content stored in the first memory region does not overlap with content stored in the second memory region.

15. A method for workload isolation, the method comprising:
- creating a secure virtualization environment associated with a processor block of a system;
- managing, via virtual machine manager (VMM) circuitry, the secure virtualization environment;
- loading data into a memory of the secure virtualization environment;
- generating a workload package, wherein the workload package is associated with a first workload and a second workload, the workload package based on the data and stored in the memory of the secure virtualization environment;
- submitting the workload package to an operational block of the system; and
- executing the first and second workloads from the secure virtualization environment;
- wherein the workloads being executed in the secure virtualization environment are isolated from other operations being executed by the operational block.

16. The method of claim 15, wherein the data is loaded into a first memory region of the memory of the secure virtualization environment and the workload package is stored in a second memory region of the memory of the secure virtualization environment.

17. The method of claim 16, wherein the second memory region of the secure virtualization environment is non-executable.

18. The method of claim 17, wherein the second memory region of the secure virtualization environment is non-executable for entities outside the secure virtualization environment.

19. The method of claim 16, further comprising writing results to a third memory region of the memory of the secure virtualization environment, the results based on the execution of the first and second workloads.

20. The method of claim 16, wherein content stored in the first memory region does not overlap with content stored in the second memory region.

* * * * *